No. 833,775. PATENTED OCT. 23, 1906.
R. A. CLEMENTS.
REVOLVING KITCHEN CABINET.
APPLICATION FILED MAR. 25, 1905.
2 SHEETS—SHEET 1.
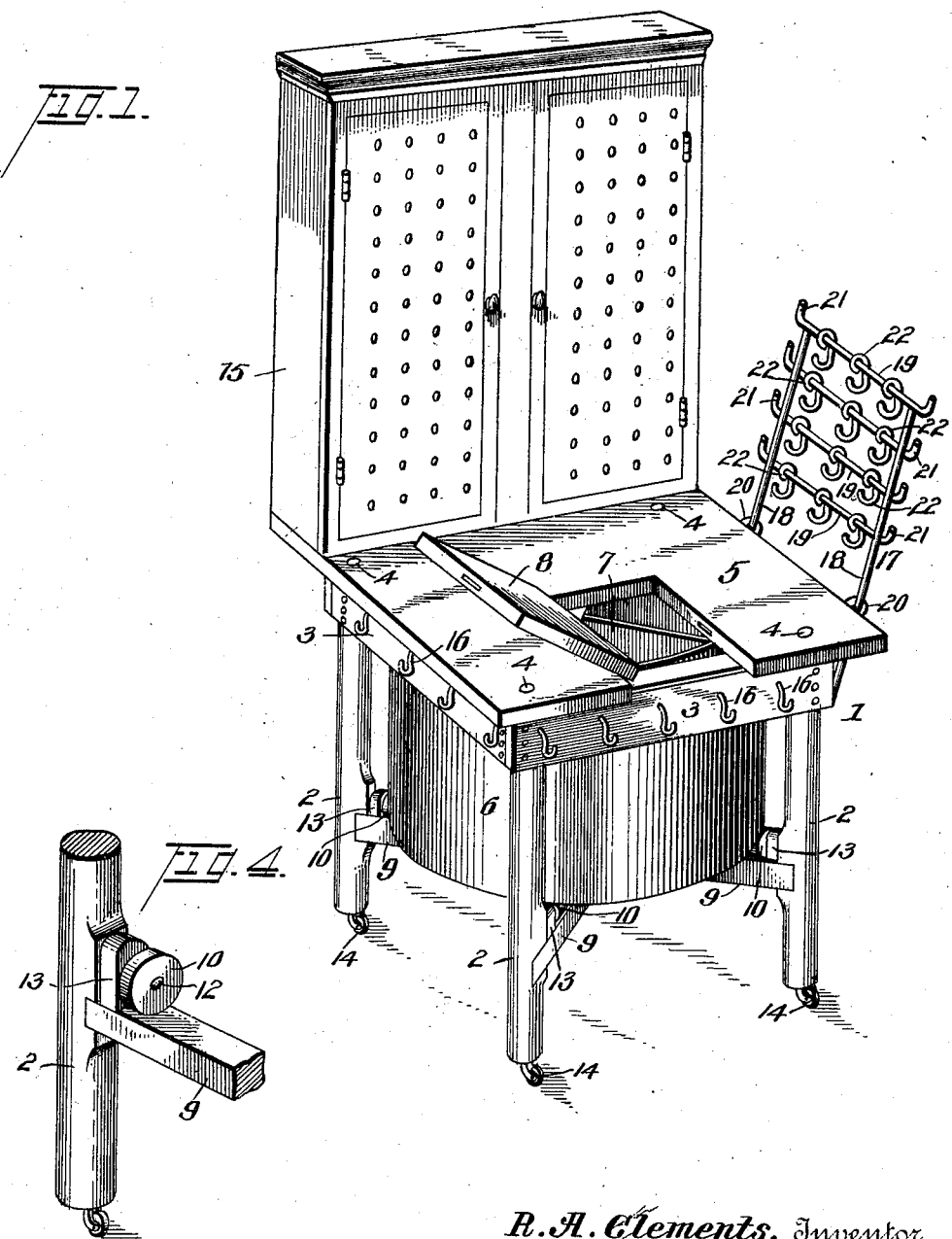

No. 833,775. PATENTED OCT. 23, 1906.
R. A. CLEMENTS.
REVOLVING KITCHEN CABINET.
APPLICATION FILED MAR. 25, 1905.
2 SHEETS—SHEET 2.
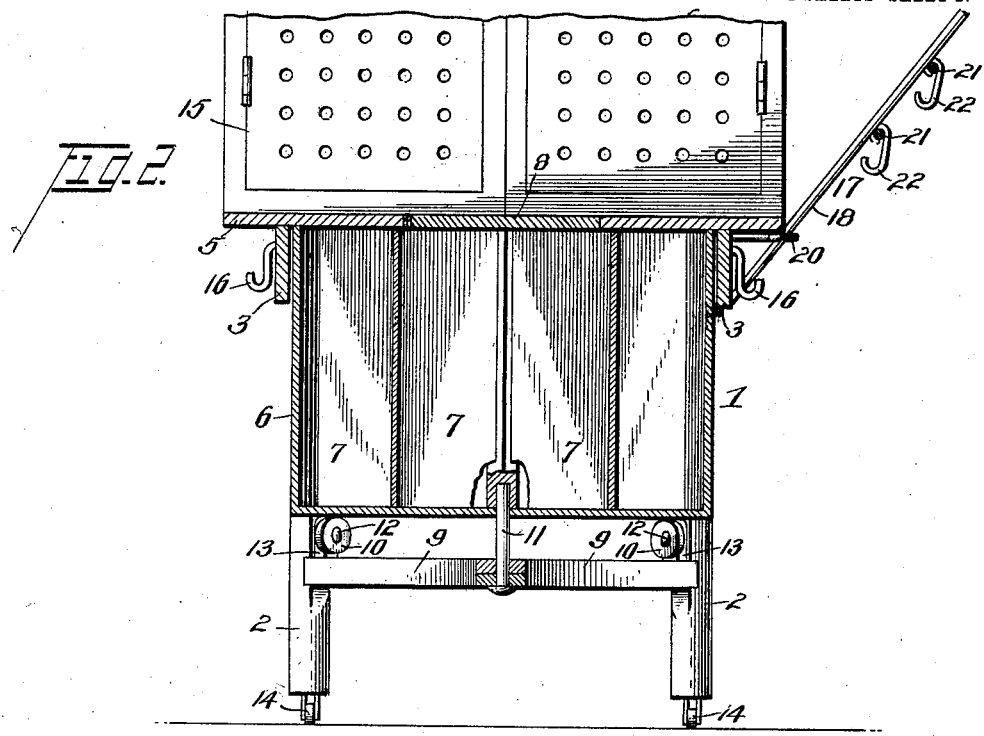
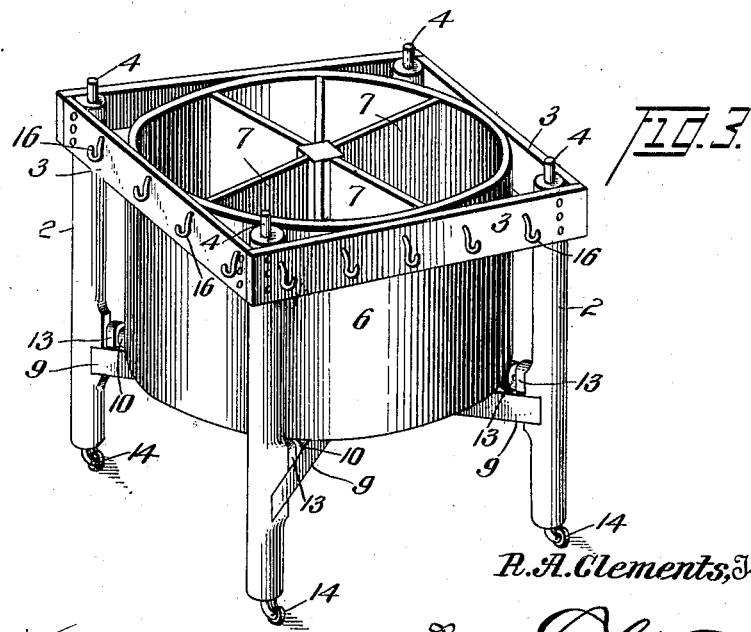
Witnesses
M. C. Lyddane
N. F. Riley
R. A. Clements, Inventor
By E. G. Siggers
Attorney

UNITED STATES PATENT OFFICE.

ROLLINGS ALSOBROOK CLEMENTS, OF DUFFAU, TEXAS.

REVOLVING KITCHEN-CABINET.

No. 833,775.     Specification of Letters Patent.     Patented Oct. 23, 1906.

Application filed March 25, 1905. Serial No. 252,043.

*To all whom it may concern:*

Be it known that I, ROLLINGS ALSOBROOK CLEMENTS, a citizen of the United States, residing at Duffau, in the county of Erath and State of Texas, have invented a new and useful Revolving Kitchen-Cabinet, of which the following is a specification.

The invention relates to improvements in kitchen-cabinets.

The object of the present invention is to improve the construction of kitchen-cabinets and to provide a simple, inexpensive, and efficient one adapted to economize space and save time and labor in the preparation of articles of food and capable of affording ready access to its contents.

A further object of the invention is to provide a combined kitchen cabinet and table adapted to afford full use of the top of the table and capable of holding the various articles necessary for the preparation of food within easy reach, so that the cook may obtain them without moving from the table.

Also the invention has for its object to enable the revolving casing or cabinet to be conveniently removed from the table for cleaning the compartments.

With these and other objects in view the invention consists in the construction and novel combination and arrangement of parts hereinafter fully described, illustrated in the accompanying drawings, and pointed out in the claims hereto appended.

In the drawings, Figure 1 is a perspective view of a revolving kitchen-cabinet constructed in accordance with this invention. Fig. 2 is a transverse sectional view. Fig. 3 is a perspective view, the top of the table being removed for permitting the removal of the rotary cabinet or casing. Fig. 4 is a detail view of a portion of one of the legs of the table, illustrating the manner of mounting the antifriction-wheels.

Like numerals of reference designate corresponding parts in all the figures of the drawings.

1 designates a kitchen-table provided with legs 2, connected at their upper ends by side bars or rails 3, suitably secured to the legs and forming a substantially rectangular top frame. The upper ends of the legs are provided with projections or pins 4, detachably engaging a removable top 5, which is provided with suitable recesses or openings to receive the pins or projections. The table-top, which may be of any desired form, is adapted to be taken off to permit the removal of a revolving casing or cabinet 6, located beneath the table-top. The rotary casing or cabinet, which is cylindrical, is open at the top, its upper edges being arranged directly beneath the table-top, which also constitutes the top of the cabinet or casing. The casing or cabinet is divided into compartments of different sizes by radial partitions 7; but the latter may be omitted, and the various materials used in the preparation of food may be contained within different receptacles. The table-top is provided with a hinged section or door 8, which when opened affords access to the revolving cabinet or table, which may be turned to bring any portion of it beneath the opening of the top of the table. By this construction the numerous doors usually employed for closing the various compartments of a revolving cabinet are dispensed with, and it is only necessary to open the single door or hinged section 8 to obtain access to all of the compartments of the cabinet or casing. The hinged door or section may be provided with a suitable lock for enabling it to be secured when closed.

The lower portions of the legs of the table are connected by diagonally-arranged crossbars 9, and the revolving cabinet or casing is supported by antifriction rollers or wheels 10 and is engaged by a central vertical pivot 11. The pivot 11 pierces the diagonally-arranged cross-bars 9 and extends upward therefrom, the cabinet or casing being provided at its bottom with a socket to receive the pivot. The antifriction rollers or wheels 10 are mounted on horizontal spindles or pivots 12, which extend from blocks 13, secured to the inner faces of the legs and extending upward from the cross-bars at the outer ends thereof. The legs, which are preferably enlarged at the ends of the cross-bars, are provided with recesses to receive the same; but the cross-bars may be secured to the legs in any other desired manner. The antifriction rollers or wheels which support the cabinet or casing permit the same to be readily rotated on the central pivot, and the said cabinet or casing is adapted to be readily lifted off the rollers or wheels and the pivot when the top of the table is removed. This will permit the cabinet or casing to be scoured or otherwise cleaned when desired. The lower ends of the legs are provided with casters 14, of the ordinary construction, for enabling the kitchen-cabinet to be readily removed from one place to another.

The rear portion of the table may form a convenient support for a kitchen-safe 15, provided with hinged doors having suitable ventilating-apertures. The kitchen safe or cabinet, which may be either loosely arranged on the table or secured to the same by screws or other suitable fastening devices, is designed to contain various articles of food requiring fresh air, and the apertures of the doors are provided for the purpose of ventilating the kitchen safe or cabinet. The kitchen safe or cabinet may be of any desired size and may extend any desired distance over the top of the table, and in practice the kitchen safe or cabinet will be arranged against one of the walls of a room, so that there will be no liability of the same falling from the table. The table and the safe may, however, be arranged in any other desired position and the parts may be constructed in any manner to secure the desired stability.

The side bars or rails of the frame of the table are preferably provided with hooks 16 for supporting various utensils and receptacles, and a rack 17 is arranged at one side of the table for a similar purpose. The rack 17, which may be arranged either in a vertical or inclined position, is located a sufficient distance beyond the adjacent door of the kitchen safe or cabinet to avoid being struck by the same, and it is composed of side bars or rods 18 and suitable connecting-rods 19. The lower ends of the side rods are secured to the frame of the table and are supported by horizontal braces 20, extending from the adjacent side bar or rail and provided with eyes to receive the side rods of the rack. The cross or connecting rods or bars of the rack extend beyond the side rods, and their terminals are bent upward to provide end hooks 21. Intermediate hooks 22 are arranged on the connecting-rods at suitable intervals and may be of any desired number. The hooks 22, which depend from the connecting rods or portions, are provided at the upper ends of their shanks with eyes receiving the rods. As the cabinet or casing is constructed of sheet metal or other suitable material and as it fits snugly against the top of the table, there is no liability of rats entering the same. If desired, ant-traps or similar devices may be arranged at the legs to prevent insects from reaching the top of the table or casing of the cabinet.

It will be seen that by combining the kitchen-table and kitchen-cabinet not only is a great saving in the space or room of a kitchen effected, but there is also a great saving of time and labor, as the various articles for the preparation of food are arranged within easy reach and the cook does not have to move away from the table to obtain the necessary materials.

Having thus fully described my invention, what I claim as new, and desire to secure by Letters Patent, is—

1. A device of the class described, comprising a table having a door at its top and provided with cross-bars connecting its legs, a rotary cabinet or casing centrally pivoted on the cross-bars, and antifriction rollers or wheels located at the ends of the cross-bars and supporting the cabinet or casing.

2. A device of the class described, comprising a table having a door at its top and provided with cross-bars connecting the lower portions of the legs, a central pivot piercing the bars and extending upwardly therefrom, supporting-blocks fitted against the inner faces of the legs and mounted on the cross-bars at the ends thereof, vertical rollers or wheels mounted on the blocks, and a rotary cabinet or casing mounted on the rollers or wheels and having a central bearing for the pivot, said casing being arranged beneath and covered by the top of the table.

3. A device of the class described, comprising a top frame, legs secured to and supporting the top frame, crossed bars connecting the legs and located beneath the top frame and provided at their point of crossing with an upwardly-projecting pivot, a rotary cabinet or casing mounted on the said pivot and rotating within the top frame, and a table-top supported by the said frame and provided with a door communicating with the interior of the rotary cabinet or casing.

In testimony that I claim the foregoing as my own I have hereto affixed my signature in the presence of two witnesses.

ROLLINGS ALSOBROOK CLEMENTS.

Witnesses:
J. W. ELKINS,
R. L. YOUNG.